United States Patent
Suzuki et al.

(10) Patent No.: US 11,749,232 B2
(45) Date of Patent: Sep. 5, 2023

(54) IMAGE GENERATION APPARATUS AND IMAGE GENERATION METHOD

(71) Applicant: SONY INTERACTIVE ENTERTAINMENT INC., Tokyo (JP)

(72) Inventors: Hisataka Suzuki, Chiba (JP); Kuniaki Oe, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 17 days.

(21) Appl. No.: 17/601,329

(22) PCT Filed: Mar. 26, 2020

(86) PCT No.: PCT/JP2020/013817
§ 371 (c)(1),
(2) Date: Oct. 4, 2021

(87) PCT Pub. No.: WO2020/213366
PCT Pub. Date: Oct. 22, 2020

(65) Prior Publication Data
US 2022/0199054 A1 Jun. 23, 2022

(30) Foreign Application Priority Data
Apr. 16, 2019 (JP) ................. 2019-077971

(51) Int. Cl.
*G09G 5/00* (2006.01)
*G09G 5/395* (2006.01)
*A63F 13/52* (2014.01)

(52) U.S. Cl.
CPC ............. *G09G 5/395* (2013.01); *A63F 13/52* (2014.09); *G09G 5/005* (2013.01);
(Continued)

(58) Field of Classification Search
CPC .............. G09G 5/395; G09G 5/005; G09G 2320/0666; G09G 2320/0673; G09G 2340/06; G06T 5/007
See application file for complete search history.

(56) References Cited

U.S. PATENT DOCUMENTS 7,307,667 B1    12/2007   Yeh et al.
2015/0245004 A1  8/2015   Guo et al.
(Continued)

FOREIGN PATENT DOCUMENTS

JP    2015-141333 A    8/2015
JP    2015141333 A     8/2015
(Continued)

OTHER PUBLICATIONS

Decision to Grant a Patent dated May 10, 2022, from Japanese Patent Application No. 2019-077971, 3 sheets.
(Continued)

*Primary Examiner* — Antonio A Caschera
(74) *Attorney, Agent, or Firm* — Katten Muchin Rosenman LLP

(57) ABSTRACT

In an image generation apparatus, an input information obtaining section obtains contents of a user operation from an input apparatus. When two images are composited, an image data generating section switches a space of image data according to a situation and stores data of images composited in the space in a frame buffer. A format control section sets a data format corresponding to the determined space in the frame buffer. An output section outputs the data read from the frame buffer as video signals corresponding to a display.

11 Claims, 14 Drawing Sheets

(52) U.S. Cl.
CPC ........... *G09G 2320/0666* (2013.01); *G09G 2320/0673* (2013.01); *G09G 2340/12* (2013.01); *G09G 2360/18* (2013.01); *G09G 2370/02* (2013.01)

(56) References Cited

U.S. PATENT DOCUMENTS

| | | | |
|---|---|---|---|
| 2015/0256860 | A1 | 9/2015 | Kunkel et al. |
| 2019/0043249 | A1* | 2/2019 | Papava ................. G06F 9/5044 |
| 2019/0080674 | A1 | 3/2019 | Wyman et al. |

FOREIGN PATENT DOCUMENTS

| | | | |
|---|---|---|---|
| JP | 2016-58848 | A | 4/2016 |
| JP | 2018-25996 | A | 2/2018 |
| JP | 2018-503283 | A | 2/2018 |
| JP | 2018025996 | A | 2/2018 |
| JP | 2018503283 | A | 2/2018 |
| WO | 2016/038950 | A1 | 3/2016 |
| WO | 2016/074999 | A1 | 5/2016 |
| WO | 2017/110823 | A1 | 6/2017 |
| WO | 2017/217011 | A1 | 12/2017 |
| WO | 2018/000126 | A1 | 1/2018 |
| WO | 2018/066482 | A1 | 4/2018 |

OTHER PUBLICATIONS

International Search Report and Written Opinion dated Jun. 23, 2020, from PCT/JP2020/013817, 11 sheets.
The extended European Search Report dated Dec. 15, 2022, from European Patent Application No. 20790668.6, 11 sheets.

* cited by examiner

FIG. 6
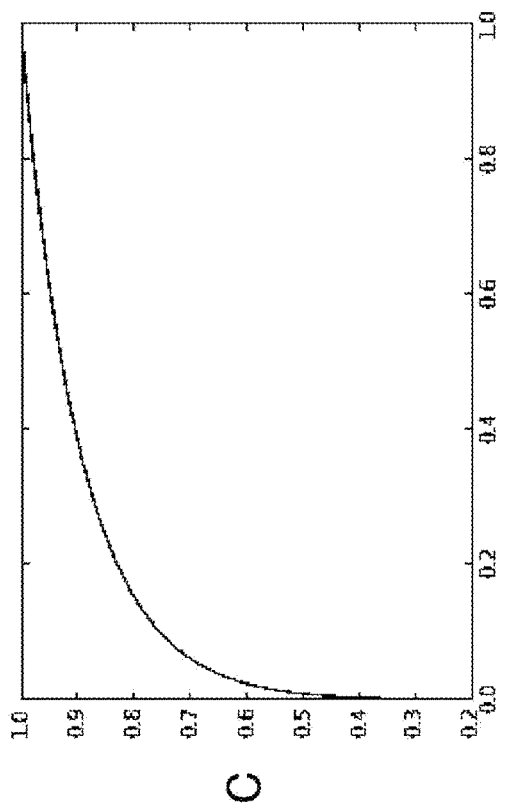
(b)
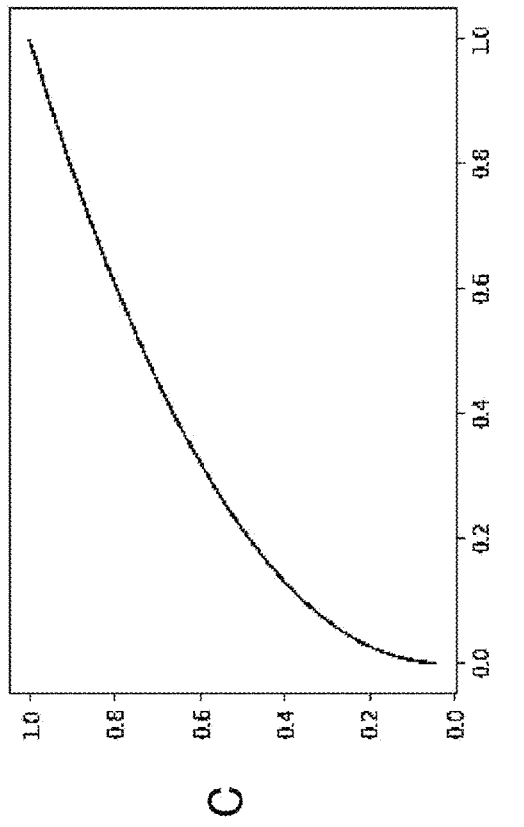
(a)

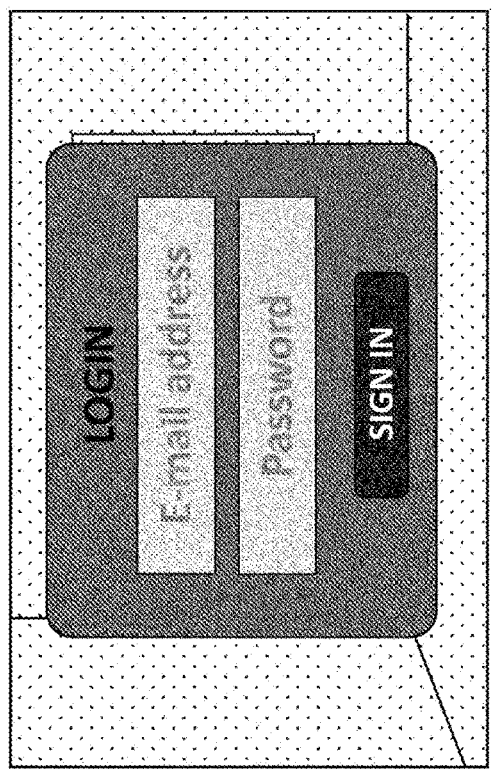
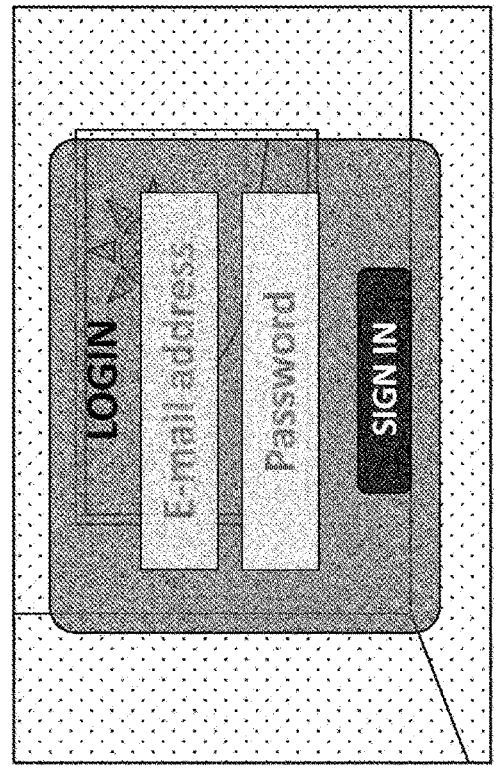
FIG. 7

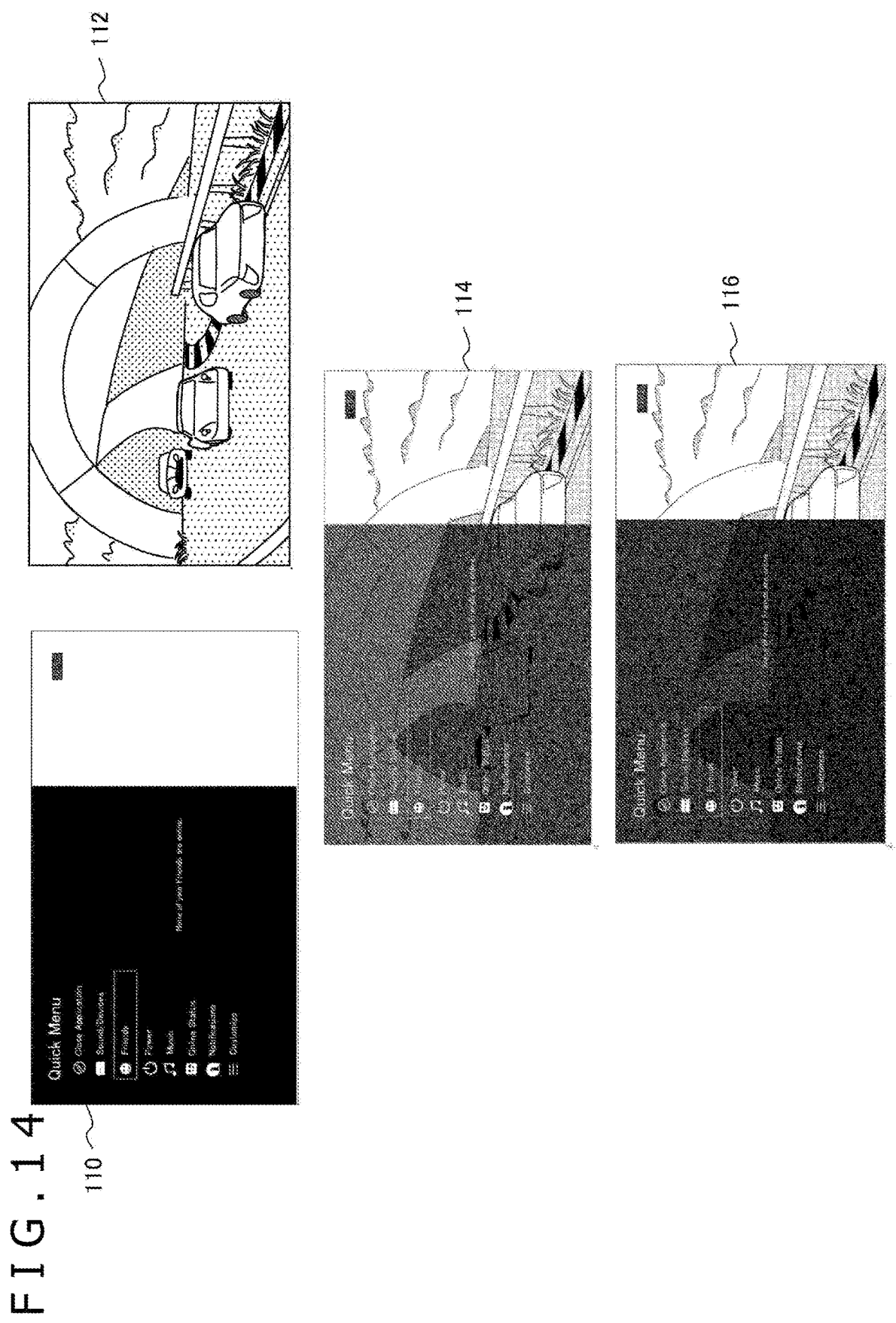

IMAGE GENERATION APPARATUS AND IMAGE GENERATION METHOD

TECHNICAL FIELD

The present invention relates to an image generation apparatus and an image generation method for generating a display image.

BACKGROUND ART

Heretofore, various techniques for enhancing the image quality in video display of television broadcasting, a distributed moving image, and the like have been developed. In recent years, in addition to the technique for enhancing resolution and color gamut, a technique for processing signals in a high dynamic range (HDR) in which a luminance range is expanded has become popular. Since an allowable luminance range of HDR is approximately 100 times as large as that of a conventional standard dynamic range (SDR), an object, such as reflection of the sunlight, which is felt dazzled in the real world, can be more realistically represented even on an image. Not only in the television broadcasting and the distributed moving image, but also in the world of computer graphics such as a game image, the representation in HDR can provide more realistic sensations in the virtual world (for example, see PTL 1).

CITATION LIST

Patent Literature

[PTL 1]
Japanese Patent Laid-Open No. 2016-58848

SUMMARY

Technical Problems

The processing required for image display has become more complicated as a result of various combinations of conditions, such as which luminance range the original image data is defined in and which luminance range a connected display supports. In particular, in a case where a plurality of images are composited and displayed, a change in these conditions may, in some cases, cause the compositing result to change, resulting in image display different from the original intention.

The present invention has been made in view of the problems described above. It is an object of the present invention to provide a technique that can appropriately control the compositing result regardless of conditions when a plurality of images are composited and displayed.

Solution to Problems

One aspect of the present invention relates to an image generation apparatus. The image generation apparatus includes an image data generating section configured to generate data of a display image, a frame buffer configured to store data of an image generated, a format control section configured to, in a case where the image generating section starts alpha compositing of a plurality of images, switch a data format of pixel values to be stored in the frame buffer, and an output section configured to read the data of the image from the frame buffer, convert the data into a format corresponding to a display, and output resulting data.

Another aspect of the present invention relates to an image generation method. As the image generation method, an image generation apparatus that generates data of a display image, stores the data in a frame buffer, and outputs the data includes a step of, in a case where alpha compositing of a plurality of images starts, switching a data format of pixel values to be stored in the frame buffer, a step of generating data of the plurality of images, alpha compositing the data, and storing resulting data in the frame buffer, and a step of reading the data of an image from the frame buffer, converting the data into a format corresponding to a display, and outputting resulting data.

It is noted that any combinations of the constituent components described above and the expressions of the present invention that are converted between a method, an apparatus, a system, a computer program, a recording medium in which the computer program is recorded, and the like are also effective as aspects of the present invention.

Advantageous Effect of Invention

According to the present invention, when a plurality of images are composited and displayed, the compositing result can be appropriately controlled regardless of conditions.

BRIEF DESCRIPTION OF DRAWINGS

FIG. 6 illustrates diagrams exemplifying conversion functions used to quantize pixel values of image data according to the present embodiment.

FIG. 7 illustrates schematic diagrams exemplifying an influence on a composite image due to the difference between conversion functions used for quantization in the present embodiment.

FIG. 14 is a diagram illustrating another example of the transition of images displayed in a case where the present embodiment is applied.

DESCRIPTION OF EMBODIMENT

Figure 1:
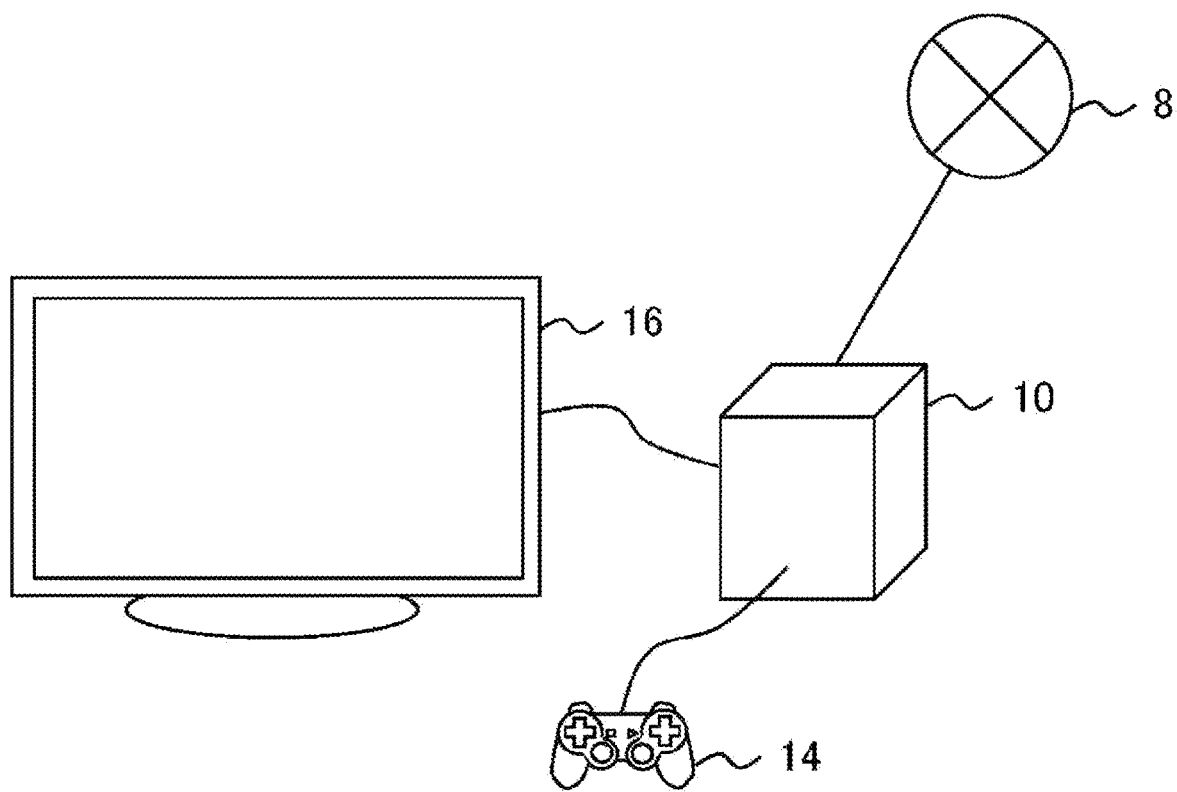
FIG. 1 is a diagram illustrating an example of a configuration of an image display system according to the present embodiment.

FIG. 1 illustrates an example of a configuration of an image display system according to the present embodiment. The image display system includes an image generation apparatus 10, an input apparatus 14, and a display 16. As illustrated in the figure, the image generation apparatus 10 may be connected to a server or the like that provides various pieces of content via a network 8 such as the Internet. The input apparatus 14 may be a general input apparatus, such as a controller, a keyboard, a mouse, a joystick, or a touchpad, with which user operation can be performed, an imaging apparatus for photographing the real world, such as a user, a microphone for obtaining sound, a sensor for detecting various physical values, or a combination of any of them.

The display 16 is implemented by a liquid-crystal display, a plasma display, an organic electroluminescent (EL) display, or the like that displays an image. Additionally, the display 16 may also include a speaker to output sound. The input apparatus 14 and the display 16 may be connected to the image generation apparatus 10 through a wired cable or may be wirelessly connected to the image generation apparatus 10 through a wireless local area network (LAN) or the like. Further, the external shapes of the input apparatus 14, the display 16, and the image generation apparatus 10 are not limited to those illustrated in the figure. For example, two or more of them may be integrally formed.

The image generation apparatus 10 receives signals related to a user operation from the input apparatus 14, performs processing in response thereto, generates data of a display image, and outputs the data to the display 16. The image generation apparatus 10 may be any of a game machine, a personal computer, a tablet terminal, a mobile terminal, a mobile phone, and the like. Depending on the form of the image generation apparatus 10 or an application or the like selected by the user, the contents of the processing performed by the image generation apparatus 10 may vary.

For example, the image generation apparatus 10 causes an electronic game specified by the user to progress in response to a user operation and generates and outputs data of a game screen of the electronic game at a predetermined frame rate. Alternatively, the image generation apparatus 10 may obtain data of a moving image from the server via the network 8 and decode and output the data sequentially. Since the purpose of use of the image generation apparatus 10 may vary and contents of information processing to be performed vary accordingly as described above, the detailed description is omitted. The following description focuses mainly on a method for suitably displaying an image of content generated as a result of such information processing, an image representing information to be presented, or the like.

Figure 2:
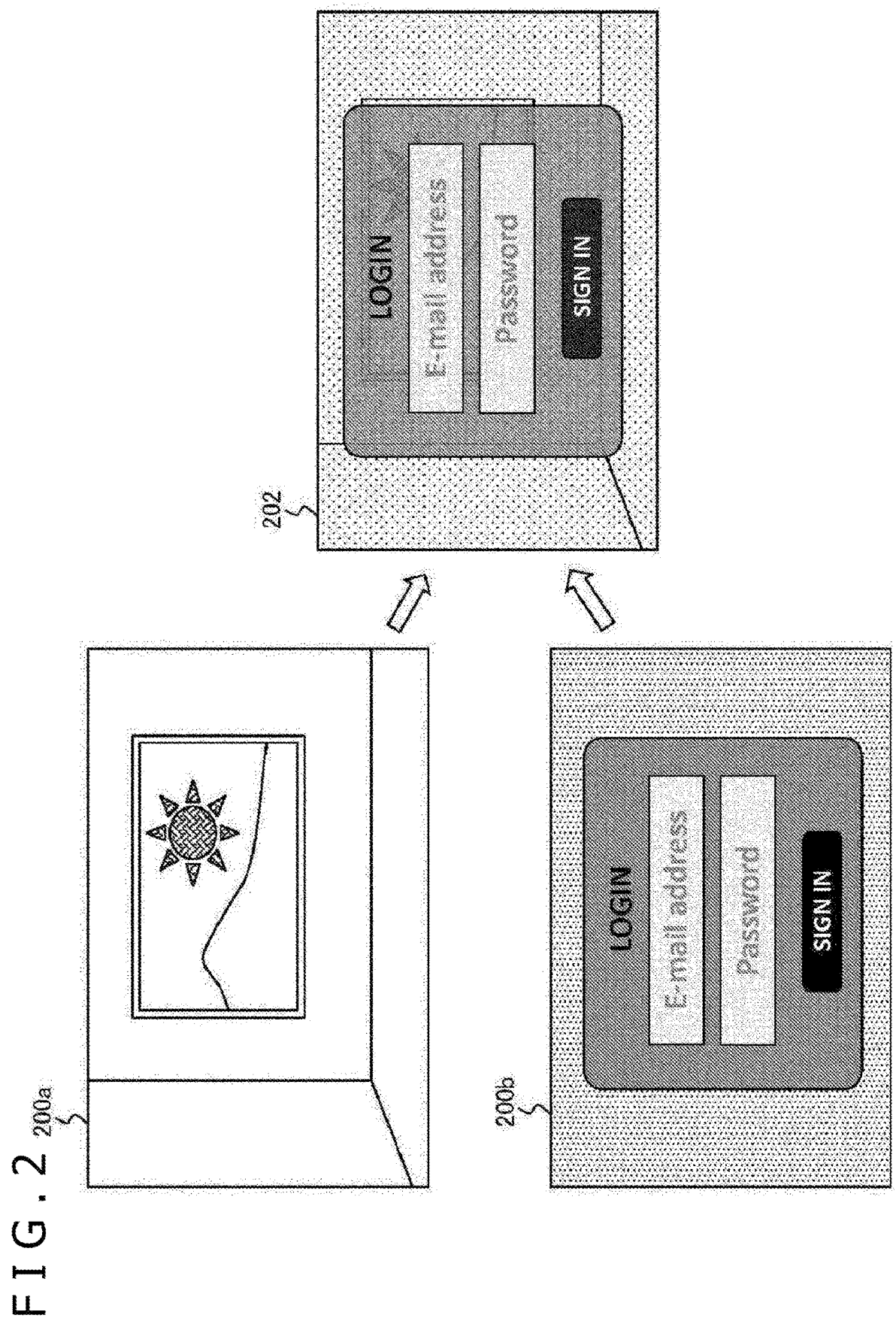
FIG. 2 is a diagram schematically illustrating an example of images generated by an image generation apparatus according to the present embodiment.

FIG. 2 schematically illustrates an example of images generated by the image generation apparatus 10 in the present embodiment. In this example, a main image 200a is, for example, an image that is mainly displayed, such as a game screen or a moving image. An additional image 200b is, for example, an image that is temporarily displayed if necessary, and the example illustrated in the figure includes a dialog box that allows the user to enter an address and password for login. When such a dialog box needs to be displayed, the image generation apparatus 10 superimposes the additional image 200b including the dialog box on the main image 200a that has been originally displayed, and generates and outputs a display image 202.

At this time, the main image 200a is made visible through the additional image 200b as a wide region as possible, so that necessary information can be suitably integrated without interrupting the view of the world of the main image 200a, such as a game or a moving image. Moreover, the transparency of the additional image 200b can be changed over time to produce an effect of making the dialog box gradually appear or disappear.

It is to be understood by those skilled in the art that there are various other possible cases in which a plurality of images are displayed on top of each other, other than the example illustrated in the figure. For example, in the case of a racing game, it is conceivable to additionally display an additional image representing a bird's eye view of the entire course in addition to a main image representing the driver's field of view. In the case of displaying a movie, it is conceivable to additionally display an image representing bibliographic information such as a storyline and actors and an operation panel for reproduction, pausing, fast-forwarding, and the like.

When the display image 202 described above is generated, a color value $C_{out}$ of each pixel of the display image 202 can be determined on the basis of the calculation of alpha compositing represented by the following equation.

$$C_{out} = (1-\alpha)C_1 + \alpha C_2 \quad \text{(Equation 1)}$$

Here, $C_1$ and $C_2$ respectively represent color values of the corresponding pixels of the main image 200a and the additional image 200b, while α represents a general α value set for the corresponding pixel of the additional image 200b, that is, a value of 0 or greater and 1.0 or less indicating the degree of transparency.

For example, changing the α value from 0 to 1.0 in the entire image gradually turns the color of the additional image 200b darker from a state in which only the main image 200a is displayed, and the additional image 200b is eventually displayed opaquely. If the α value is set to an intermediate value that is greater than 0 and less than 1.0, the additional image 200b becomes translucent with the density corresponding to this value. Accordingly, the main image 200a is visible through the additional image 200b.

It is noted that, if the main image 200a and the additional image 200b are RGB images, the color values $C_1$ and $C_2$ are set to each of these three channels. In the present embodiment, however, they are collectively referred to as the color values $C_1$ and $C_2$. Further, each of the color values $C_1$ and $C_2$ and the α value is set for each pixel. Thus, strictly speaking, the color values $C_1$ and $C_2$ and the α value depend on two-dimensional position coordinates (x, y) on an image plane. However, since Equation 1 assumes the calculation of pixels at the same position, the position coordinates are not presented. This similarly applies to the following description.

Figure 3:
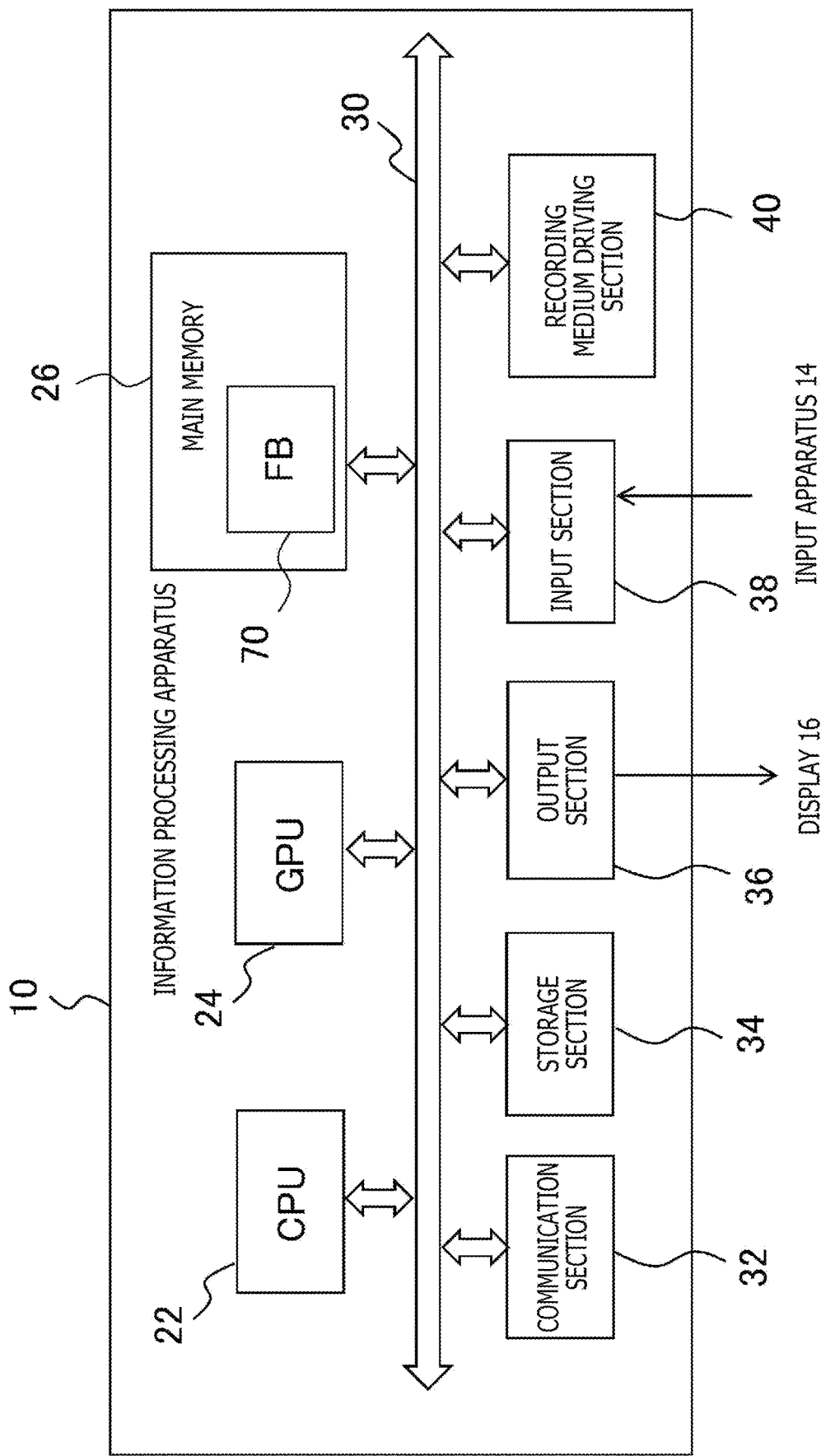
FIG. 3 is a diagram illustrating an internal circuit configuration of the image generation apparatus according to the present embodiment.

FIG. 3 illustrates an internal circuit configuration of the image generation apparatus 10. The image generation apparatus 10 includes a central processing unit (CPU) 22, a graphics processing unit (GPU) 24, and a main memory 26. Each of these units is connected to each other via a bus 30. Additionally, a communication section 32, a storage section 34, an output section 36, an input section 38, and a recording medium driving section 40 are also connected to the bus 30. The communication section 32 includes a peripheral device interface such as universal serial bus (USB) or Institute of Electrical and Electronics Engineers (IEEE) 1394 or a wired or wireless LAN network interface for connecting to the network 8 or the like. The storage section 34 is a hard disk drive, a non-volatile memory, or the like. The output section 36 outputs video signals to the display 16. The input section 38 receives data from the input apparatus 14. The recording medium driving section 40 drives a removable recording medium such as a magnetic disk, an optical disc, or a semiconductor memory.

The CPU 22 controls the entire image generation apparatus 10 by executing an operating system stored in the storage section 34. The CPU 22 also executes various programs that are read from the removable recording medium and loaded into the main memory 26 or downloaded via the communication section 32. The communication section 32 may also establish communication with an external apparatus, such as the server, via the network 8 to obtain data of electronic content such as a moving image or to transmit data generated inside the image generation apparatus 10.

The main memory 26 includes a random access memory (RAM). The main memory 26 includes a frame buffer 70 that stores image data to be displayed. Here, there is no limitation on the number of frame buffers. Further, the main memory 26 also stores programs and data necessary for processing. The GPU 24 has a function of a geometry engine and a function of a rendering processor to perform rendering processing according to a rendering instruction from the CPU 22 and store resulting data in the frame buffer 70. The output section 36 reads the data of the image from the frame buffer 70 and outputs the data of the image as video signals to the display 16 at an appropriate timing.

Figure 4:
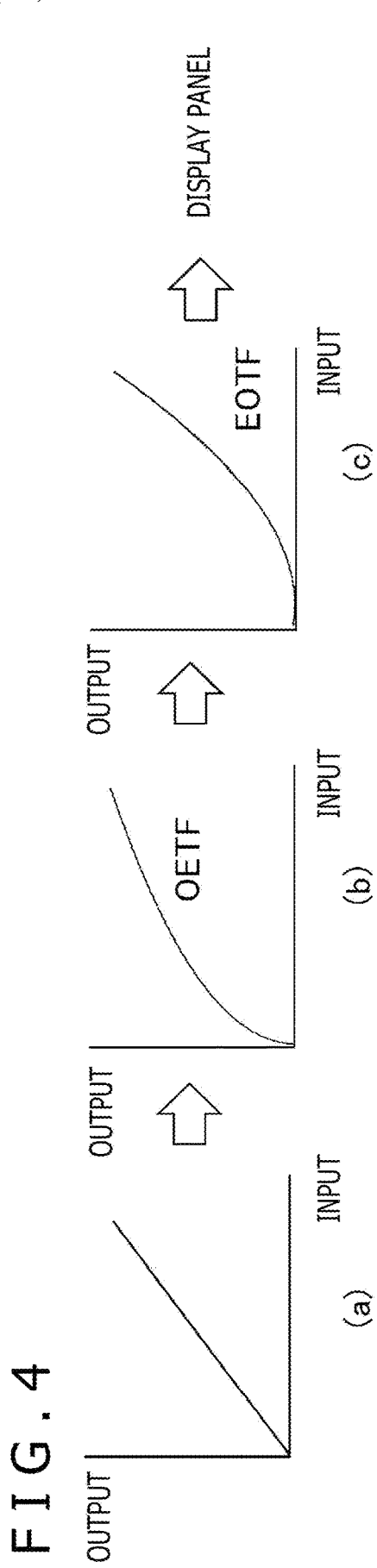
FIG. 4 illustrates diagrams for describing a general processing flow related to video signals.

FIG. 4 is a diagram for describing a general processing flow related to video signals. In (a), a pixel value before quantization of an image rendered by the GPU 24 or the like of the image generation apparatus 10 is an input value while a color value that should thereby be represented is an output value. As a matter of course, the two values have a linear relationship. When data having such a linear characteristic is stored in the frame buffer 70 of the image generation apparatus 10, the data is quantized by an optical-electro transfer function (OETF) as illustrated in (b). Different functions are used for an image whose luminance range is defined by SDR and an image whose luminance range is defined by HDR, so that SDR or HDR video signals having a predetermined color depth are generated.

The output section 36 reads the video signals from the frame buffer 70 and supplies the video signals to the display 16. The display 16 converts the video signals into luminance values by an electro-optical transfer function (EOTF) as illustrated in (c). By appropriately selecting EOTF, even if signals have the same color depth, a luminance value in the range of 0 to 100 nits is obtained for each pixel in the case of an SDR image while a luminance value in the range of 0 to 10000 nits, which is a different range from that of the SDR image, is obtained for each pixel in the case of an HDR image. Each luminance value is further corrected according to the luminance characteristic of a display panel, and then sequentially output at an appropriate timing. Accordingly, the image is displayed in the corresponding luminance range.

Figure 5:
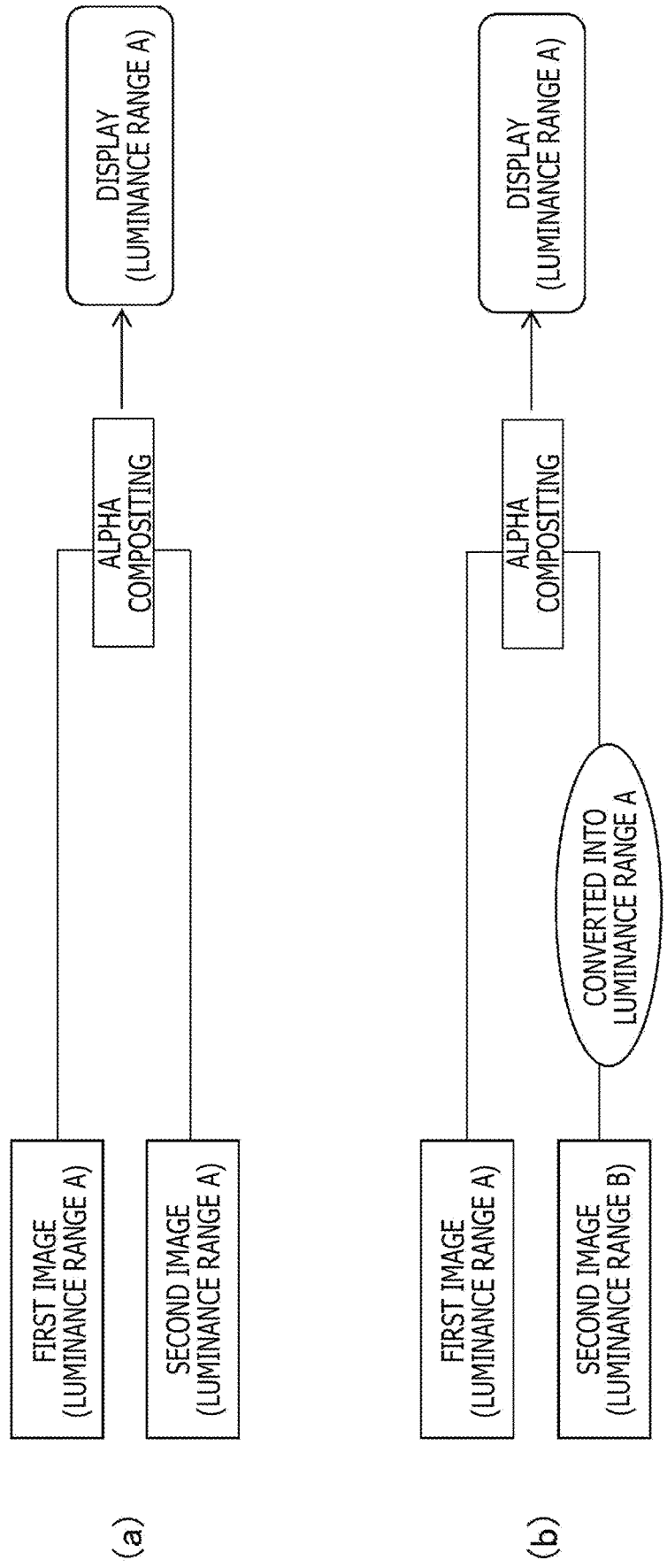
FIG. 5 illustrates diagrams of basic processing flows for a case where two images are composited.

FIG. 5 illustrates basic processing flows for a case where two images are composited. In the figure, one of a "luminance range A" and a "luminance range B" is, for example, for SDR while the other is for HDR. Further, each pixel value of each image is generally quantized to a value within the range of 0 to 1.0. In (a), illustrated is an environment in which two images to be composited are rendered in the same luminance range "A," and the display 16 also processes and displays video signals in the luminance range "A." In this case, substituting each pixel value of the first and second images, which are to be composited, into Equation 1 as it is generates a composite image defined by the luminance range "A." By outputting the composite image to the display 16, the composite image can thus be displayed.

Represented in (b) is a case where the first image is rendered in the luminance range "A" corresponding to the display, while the second image is rendered in the luminance range "B" different from the luminance range "A." For example, assume that the first image and the second image correspond to the main image 200*a* and the additional image 200*b* of FIG. 2, respectively. In this case, a conceivable case is such that the former is displayed in HDR to achieve dynamic image representation while the SDR image provided by the system is superimposed thereon.

In this case, the image generation apparatus 10 needs to convert the data of the second image into values in the luminance range A before substituting the values into Equation 1 and alpha compositing the first image and the second image. Here, the luminance range conversion can be performed by mapping the SDR luminance range to part of the HDR luminance range. For example, the peak luminance (1.0) of SDR is mapped to the brightness of approximately 100 to 300 nits in the HDR luminance range, and the SDR value of 0 to 1.0 is mapped by linear interpolation. However, there is no intention to limit the luminance range conversion thereto.

However, since the pixel values determined for each image are values that have been converted and quantized by the OETF described above (hereafter referred to as a conversion function), the assumed conversion function has an influence on the compositing result. FIG. 6 exemplifies conversion functions used to quantize the pixel values of image data. Represented in (a) is a conversion function used in sRGB, which is the standard for an SDR color space. Assuming that an original pixel value, that is, luminance to be represented, is P and the color value after quantization is C, most of the range exhibits a gamma curve in the form of $C=P^{(1/\gamma)}$. Hereinafter, the space of color values quantized by such a function will be referred to as an "sRGB space." However, there is no intention to limit the curve applied to the SDR image. A gamma 2.2 curve with $\gamma=2.2$, a gamma 2.4 curve with $\gamma=2.4$, or the like is similarly applied.

Represented in (b) is a conversion function called a PQ curve used in an HDR color space. Hereinafter, the space of color values quantized by such a function will be referred to as a "PQ space." However, there is no intention to limit the curve applied to the HDR image. As illustrated in (a) and (b), if the characteristics of quantized color values with respect to luminance differ, the difference in characteristics affects the weighting of the two terms in Equation 1. This causes the balance of the images to be composited to be deviated from the one intended by the setting of the α value.

FIG. 7 illustrates schematic diagrams exemplifying the influence on the composite image due to the difference between the conversion functions used for quantization. (a) and (b) illustrated assume a case where the main image 200*a* and the additional image 200*b* illustrated in FIG. 2 are alpha composited. Represented in (a) of FIG. 7 is a case where both the main image and the additional image are SDR images and the display is also an SDR display, as illustrated in (a) of FIG. 5. Therefore, everything is processed in the sRGB space. In (b) of FIG. 7, as illustrated in (b) of FIG. 5, the main image is generated in HDR while the additional image is generated in SDR. To cause the additional image to be displayed on the HDR display, the additional image is converted into data in the HDR luminance range.

In this case, generally, along with the luminance range conversion, the characteristic with respect to luminance is also converted. For example, the additional image, which is an SDR image, is composited after being converted from the data in the sRGB space into data in the PQ space. Accordingly, each color value of the composite image can be calculated by the weighted sum in the same space using Equation 1. In the composite image of (b), however, compared to (a), the main image is less transmissive in a region in which the additional image is dark. This is due to the fact that, compared to the sRGB curve, the PQ curve increases the increase rate of the color value in a low luminance region, so that more weight is substantially applied to the image with lower luminance among the images to be composited.

In this manner, if the conversion function is determined depending on the connected display, a composite image may be, in some cases, displayed in such a state that is not expected by the application or the system. Moreover, even when the same content is being displayed, the display impression may vary depending on the connected display. Therefore, in the present embodiment, the conversion function is determined independently of the luminance range of the display, so that images can be composited in that space.

Figure 8:
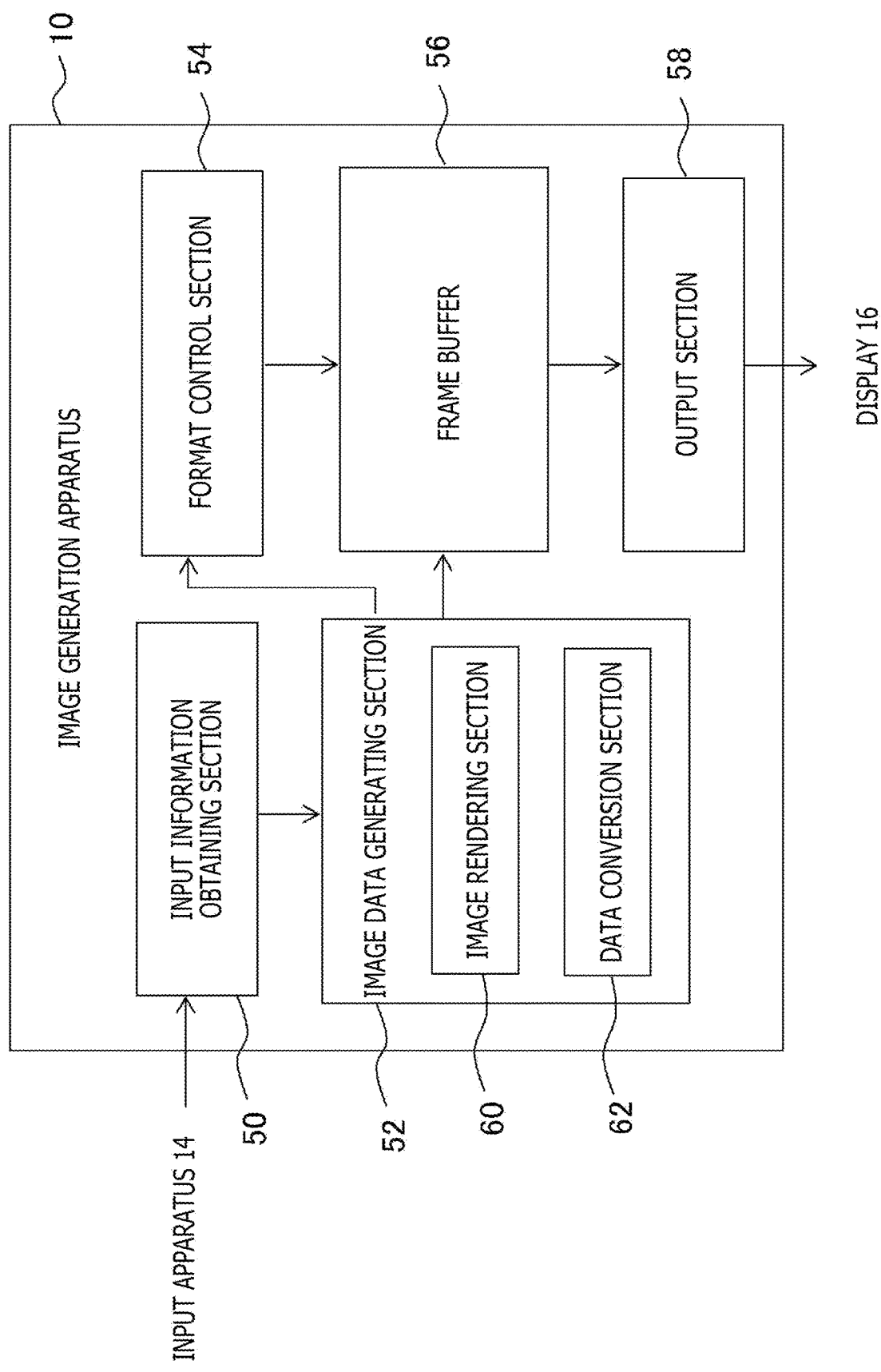
FIG. 8 is a diagram illustrating a configuration of functional blocks of the image generation apparatus according to the present embodiment.

FIG. 8 illustrates a configuration of functional blocks of the image generation apparatus 10 according to the present embodiment. The functional blocks illustrated in FIG. 8 can be implemented by the configurations of the CPU, the GPU, various memories, the data bus, and the like illustrated in FIG. 3 in terms of hardware and can be implemented by a program that is loaded into a memory from a recording medium or the like and that performs various functions, such as a data input function, a data retention function, a calculation function, an image processing function, and a communication function, in terms of software. Therefore, it is to be understood by those skilled in the art that these functional blocks can be implemented in various forms by hardware alone, software alone, or a combination thereof and are not limited to any of these forms.

The image generation apparatus 10 includes an input information obtaining section 50, an image data generating section 52, a frame buffer 56, a format control section 54, and an output section 58. The input information obtaining section 50 obtains input information from the input apparatus 14. The image data generating section 52 generates data of a display image. The frame buffer 56 stores data of an image generated. The format control section 54 switches a data format of pixel values to be stored in the frame buffer 56. The output section 58 outputs the data of the display image to the display 16.

The input information obtaining section 50 is implemented by the input section 38, the CPU 22, and the like of FIG. 3 and obtains data indicating the contents of a user operation from the input apparatus 14. Here, the user operation may be an operation, such as the selection of an application or content to be executed, start/end of processing, or input of a command, which is performed on a general information processing apparatus, a mobile terminal, and a game apparatus. The input information obtaining section 50 may also obtain data of electronic content, such as a moving image, from the server via the network 8. The input information obtaining section 50 supplies the obtained data to the image data generating section 52 and the format control section 54 as appropriate.

The image data generating section 52 is implemented by the CPU 22, the GPU 24, and the like of FIG. 3 and generates an image to be displayed according to the contents of a user operation or the like. Specifically, the image data generating section 52 includes an image rendering section 60 and a data conversion section 62. The image rendering section 60 generates an image that constitutes a display image, regardless of whether or not a plurality of images are composited. For example, the image rendering section 60 causes the electronic game to progress according to a user operation and renders an image of the electronic game at a predetermined frame rate. Alternatively, the image rendering section 60 may decode and decompress data of a moving image specified by the user.

The moving image may be obtained from an imaging apparatus as the input apparatus 14 or distributed from the server via the network 8. The moving image may be the one stored in a connected external storage apparatus or the like. Hereinafter, a game image or a moving image generated in this manner will be referred to as a first image. The image rendering section 60 stores color values, which are obtained by quantizing the luminance of each pixel of the generated first image, in the frame buffer 56.

The image rendering section 60 further generates a second image, if necessary. The second image may be displayed at any time by being called up by the user or may be displayed at a timing determined according to the progress of the game or the moving image. Alternatively, the second image may be displayed at all times in a corner of the screen. In any case, the second image is an image to be superimposed on the first image, and the degree of transparency at which the second image is displayed is set by the α value. The α value may be set for each pixel or each region. Alternatively, the α value may be fixed in the entire image. Further, the setting value may be changed over time.

During a period in which the second image needs to be superimposed, the image rendering section 60 first stores quantized color values of the first image in the frame buffer 56, and overwrites the data by calculating weighted sums of the quantized color values of the first image and quantized color values of the second image. The data conversion section 62 converts the luminance range of the image data that is subject to compositing, if necessary. The data conversion section 62 also converts the space of the image data that is subject to compositing, if necessary. In other words, the conversion is performed such that the pieces of data of the first and second images have values with a common characteristic with respect to luminance. For example, in a case where an SDR image and an HDR image are composited, the SDR image is converted from the sRGB space into the PQ space. Alternatively, the HDR image is converted from the PQ space into the sRGB space.

At this time, the data conversion section 62 determines a conversion destination space independently of the space that is set by the connected display 16 when the display 16 processes video signals, that is, independently of the used EOTF. For example, even if the HDR display is connected, it is allowable to convert the first image, which is an HDR image, into the sRGB space. This makes it possible to display a composite image with transparency similar to that of a case where both images are SDR images and composited and displayed on the SDR display, as illustrated in (a) of FIG. 7.

Alternatively, the second image, which is an SDR image, is converted into the PQ space without converting the first image, which is an HDR image. As illustrated in (b) of FIG. 7, even if this results in a composite image with a different impression from that of the image of (a), it is possible to maintain the HDR image representation while suppressing the influence on the first image caused by compositing. In this manner, the compositing result changes depending on the space in which the image is composited. Therefore, among the reproducibility of the composite image and the reproducibility of the original image, the data conversion section 62 determines the one with higher priority on the basis of the settings in the application or the system causing the image to be displayed, and selects a corresponding space as the conversion destination.

The format control section 54 is implemented by the CPU 22 of FIG. 3 and switches the data format of the pixel values to be stored in the frame buffer according to the space of the conversion destination selected by the data conversion section 62. Generally, the pixel values of an SRD image and an HDR image are each subject to tone compression mainly in a high-luminance region by the corresponding conversion function, and each color is converted so as to fit in a predetermined number of bits. Here, using a function different from the conversion function originally supported may, in some cases, generate a case where the converted values cannot be stored in the same data format. In order to store such data in the frame buffer 56, the format control section 54 switches at least one of the bit depth of each color and whether a decimal point is fixed or float.

In a case where the image data generating section 52 does not perform alpha compositing or in a case where a general format suffices even if alpha compositing is performed, the format control section 54 does not need to switch the format of the frame buffer 56. The frame buffer 56 stores data of images generated or composited by the image rendering section 60. In a case where the second image is composited, the first image is first stored. Then, the results of the calculation of the pixel values of the first image and the pixel values of the second image are stored. These are carried out on the same data format under the control of the format control section 54.

The output section 58 is implemented by the GPU 24, the output section 36, and the like of FIG. 3 and reads data of an image from the frame buffer 56 and sequentially outputs the data to the display 16. Here, in a case where the data stored in the frame buffer 56 is different from the data format corresponding to the luminance range of the display 16, the output section 36 further spatially converts the data and outputs resulting data as video signals in a format suitable for the display 16.

Figure 9:
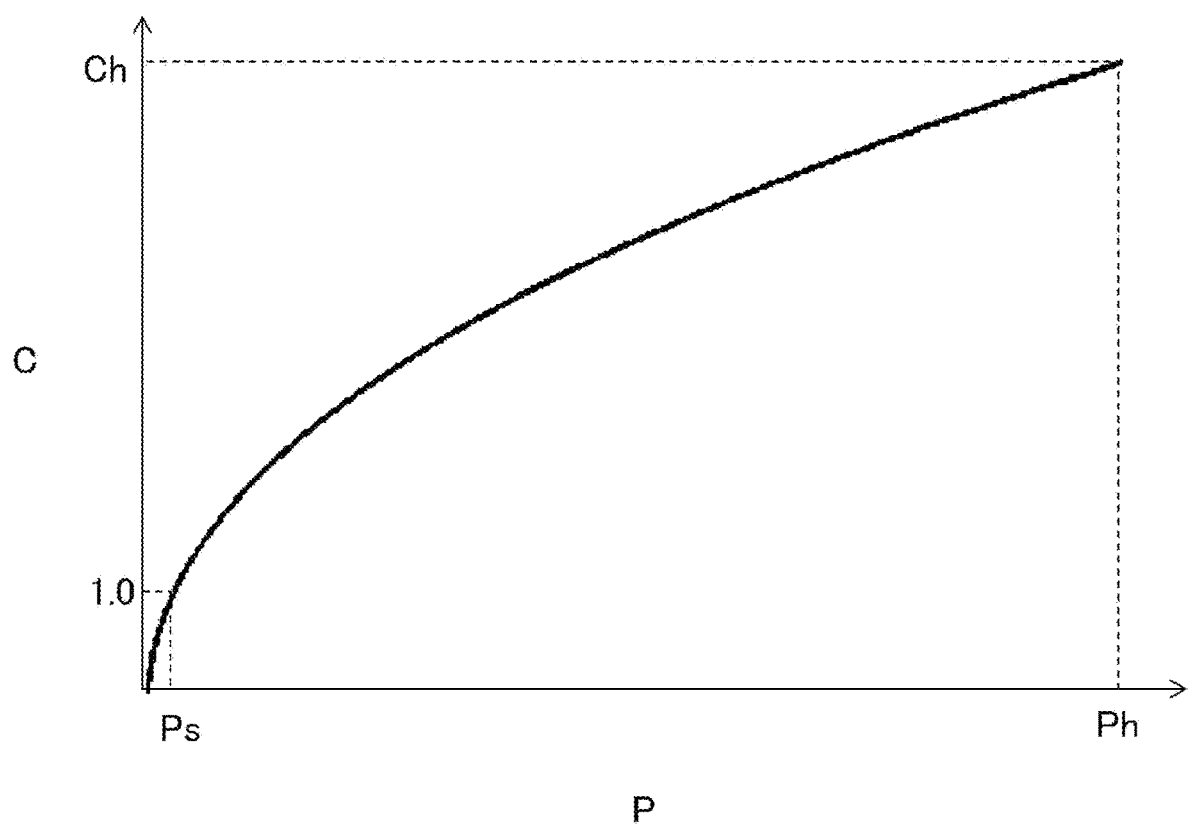
FIG. 9 is a diagram for describing the range of converted color values for a case where an HDR image is converted into an sRGB space as an example of the present embodiment.

FIG. 9 is a diagram for describing the range of converted color values for a case where an HDR image is converted into the sRGB space as an example of the present embodiment. The graph in the figure represents the conversion function used for sRGB as in (a) of FIG. 6. It is noted that the upper limit of a pixel value P denoted on the horizontal axis, that is, the range of the original luminance, is set to peak luminance Ph of HDR, which is larger than the peak luminance Ps of SDR. Although the peak luminance Ph of HDR is approximately 100 times the peak luminance Ps of SDR, the figure is schematically illustrated for the sake of clarity.

The conversion function of sRGB converts luminance of 0 to Ps into a color value of 0 to 1.0. Meanwhile, if the same function is used to convert a wide range of HDR luminance, its maximum value Ch becomes larger than 1.0, as a matter of course. The PQ curve generally used for an HDR image also converts luminance into a color value of 1 to 1.0. Therefore, values obtained by converting the HDR image using the sRGB function cannot be fully stored in the frame buffer of the data format set for such general processing. Accordingly, the format control section 54 switches the format of the frame buffer 56 according to the conversion of the HDR image into the sRGB space.

The table below illustrates typical examples of spatial conversions and data formats for the combinations of the luminance ranges of images to be composited and the luminance ranges of the displays that are set in the present embodiment.

TABLE 1

| Display | SDR | HDR | |
|---|---|---|---|
| Data format | R8G8B8A8 Unorm | R10G10B10A2 Unorm | R11G11B10 Float |
| Image SDR | No conversion | SDR -> HDR (PQ) | SDR -> HDR (sRGB) |
| HDR | HDR -> SDR | No conversion | HDR (PQ) -> HDR (sRGB) |

As illustrated in the second column of the table, in a case where the SDR image is represented on the SDR display, a total of 32 bits of fixed-point data format is set; 8 bits are set for each of the red, green, and blue color values and 8 bits are set for the α value. This is represented as "R8G8B8A8Unorm" in the table. In a case where the SDR image and the HDR image are composited for display in this environment, the SDR image is not converted while HDR color values are converted into values in the SDR luminance range by mapping or the like.

By contrast, as illustrated in the third column of the table, in a case where the HDR image is represented on the HDR display, a total of 32 bits of fixed-point data format is set in a certain situation; 10 bits are set for each of the red, green, and blue color values and 2 bits are set for the α value. This is represented as "R10G10B10A2Unorm" in the table. In a case where the SDR image and the HDR image are composited for display in this environment, the HDR image is not converted while SDR color values are converted into values in the HDR luminance range by mapping or the like.

In this case, the color values originally represented in the sRGB space are converted into the PQ space. Accordingly, composited color values can be obtained in the PQ space through compositing using Equation 1. Further, since the converted SDR color values do not exceed 1.0, the composited color values also do not exceed 1.0, and the originally set data format suffices. However, in this case, as illustrated in (b) of FIG. 7, the compositing result changes from the result of compositing the SDR images.

For this reason, as described above, there is provided a processing path for compositing in the sRGB space. In this case, if the data format in the third column of the table is used, values exceeding 1.0 are clamped and all of the values are recorded as 1.0, which eventually significantly changes the composite image. Therefore, as illustrated in the fourth column of the table, a total of 32 bits of floating-point data format is prepared; 11 bits are set for each of the red and green color values and 10 bits are set for the blue color value. This is represented as "R11G11B10Float" in this table.

Under the limitation of a total of 32 bits, the number of bits is preferentially assigned in the order of green, red, and blue, on the basis of the level of the visual sensitivity.

Further, in this example, no storage region is provided for the α value. However, in a case where it is necessary to hold an a plane for each image that is subject to compositing, such as in a case where an additional image is composited on a composite image written to the frame buffer 56, bits also need to be assigned to the α value. Therefore, other than the examples illustrated in the table, the data format is selected appropriately according to various settings at the time of compositing and the number of bits that can be prepared for each pixel.

For example, in the examples described so far, the PQ space or the sRGB space is mainly used as the space in which alpha compositing is performed. However, an actual curve to be applied is not limited thereto as long as compositing is performed in the same space. Depending on the number of bits that can be prepared for each pixel, it is conceivable to perform compositing in a linear space. Further, compositing may be performed in the space such as gamma 2.2 or gamma 2.4 described above. When the data conversion section 62 selects one of them, the format control section 54 switches the data format of the frame buffer 56, so that the values quantized thereby can be stored.

In any case, even if the converted color values of the HDR image significantly exceed 1.0, the switching of the data format makes it possible to store the color values in the frame buffer. In this case, although an error occurs in the HDR image itself, transparency of the composite image can be suitably reproduced.

Figure 10:
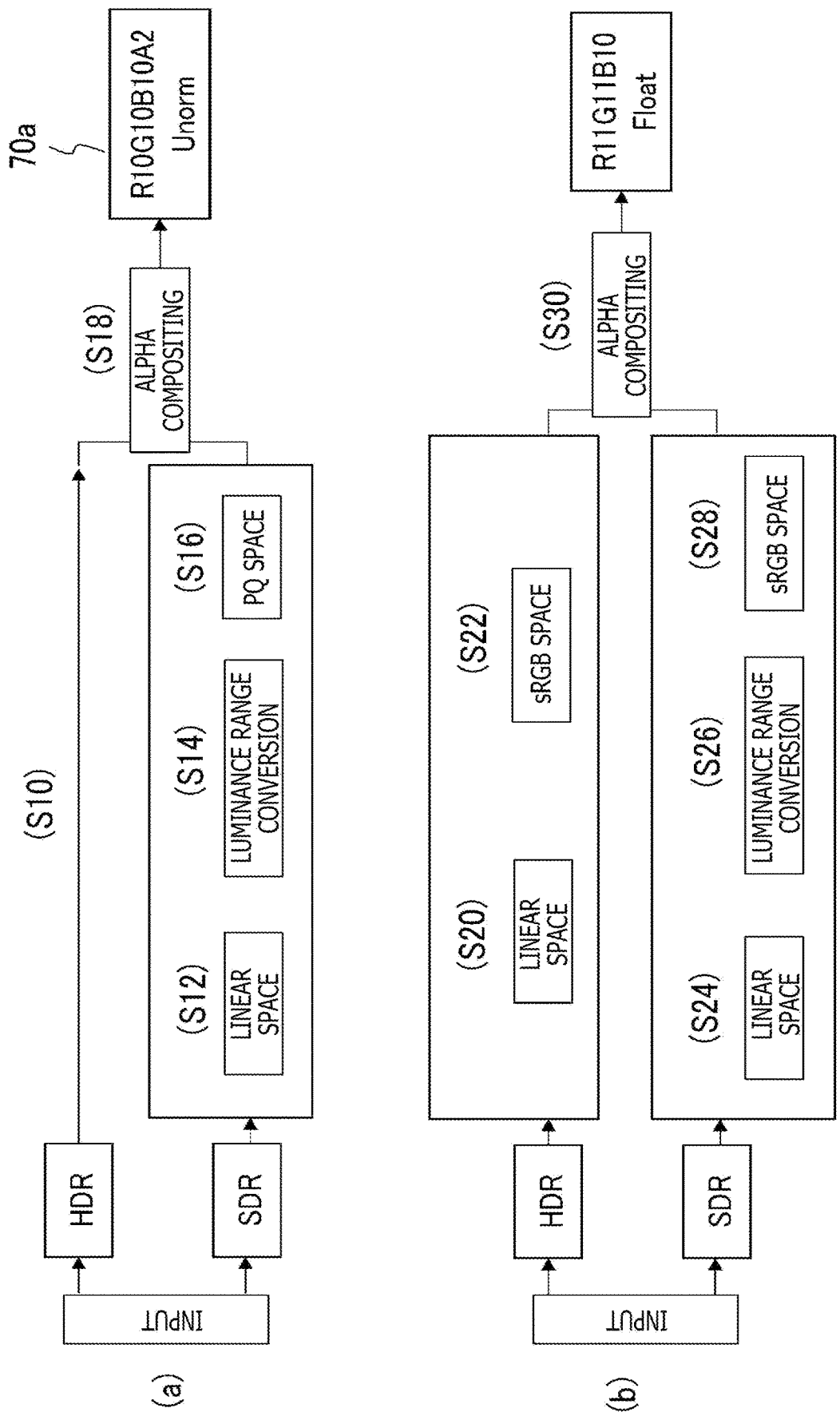
FIG. 10 illustrates diagrams comparing a procedure for generating a composite image of an SDR image and an HDR image, which is to be displayed on an HDR display, in a perceptual quantization (PQ) space with a procedure for the same in the sRGB space in the present embodiment.

FIG. 10 compares a procedure for generating a composite image of an SDR image and an HDR image, which is to be displayed on the HDR display, in the PQ space with a procedure for the same in the sRGB space. Represented in (a) is a case where compositing is performed in the PQ space. As described above, the HDR image is not converted (S10). Since the gamma curve conversion has been performed on the SDR image in the sRGB space, the data conversion section 62 once returns the data to a linear space having no curve (S12). EOTF illustrated in FIG. 4 can be used for this.

The data conversion section 62 maps each value proportional to the original luminance obtained in this manner, to part of the HDR luminance range, thereby converting the value into the one in the HDR luminance range (S14). This is actually a process of extending a color gamut through matrix calculation, for which a known calculation method can be used. Then, the data conversion section 62 performs the PQ curve conversion on the data whose luminance range has been converted in this manner, to obtain data in the PQ space (S16). Accordingly, both of the images to be composited are represented in the PQ space. Therefore, both of the images are alpha composited using Equation 1 (S18), and the resulting data is stored in the frame buffer of "R10G10B10A2Unorm" 70a.

Represented in (b) is a case where compositing is performed in the sRGB space and the data conversion section 62 also converts the HDR image. That is, since the PQ curve conversion has been performed on the HDR image, the data conversion section 62 once returns the data of this image to the linear space having no curve using EOTF (S20). Then, the data conversion section 62 performs the sRGB curve conversion on the data to obtain data in the sRGB space (S22).

Meanwhile, as in the case of (a), after the SDR image is once returned to the linear space (S24), the SDR image is converted into values in the HDR luminance range (S26). After that, the data conversion section 62 performs the sRGB curve conversion on the data whose luminance range has been converted, to obtain data in the sRGB space (S28). Accordingly, both of the images to be composited are now represented in the sRGB space. Therefore, both of the images are alpha composited using Equation 1 (S30), and the resulting data is stored in the frame buffer of "R11G11B10Float" 70b.

Figure 11:
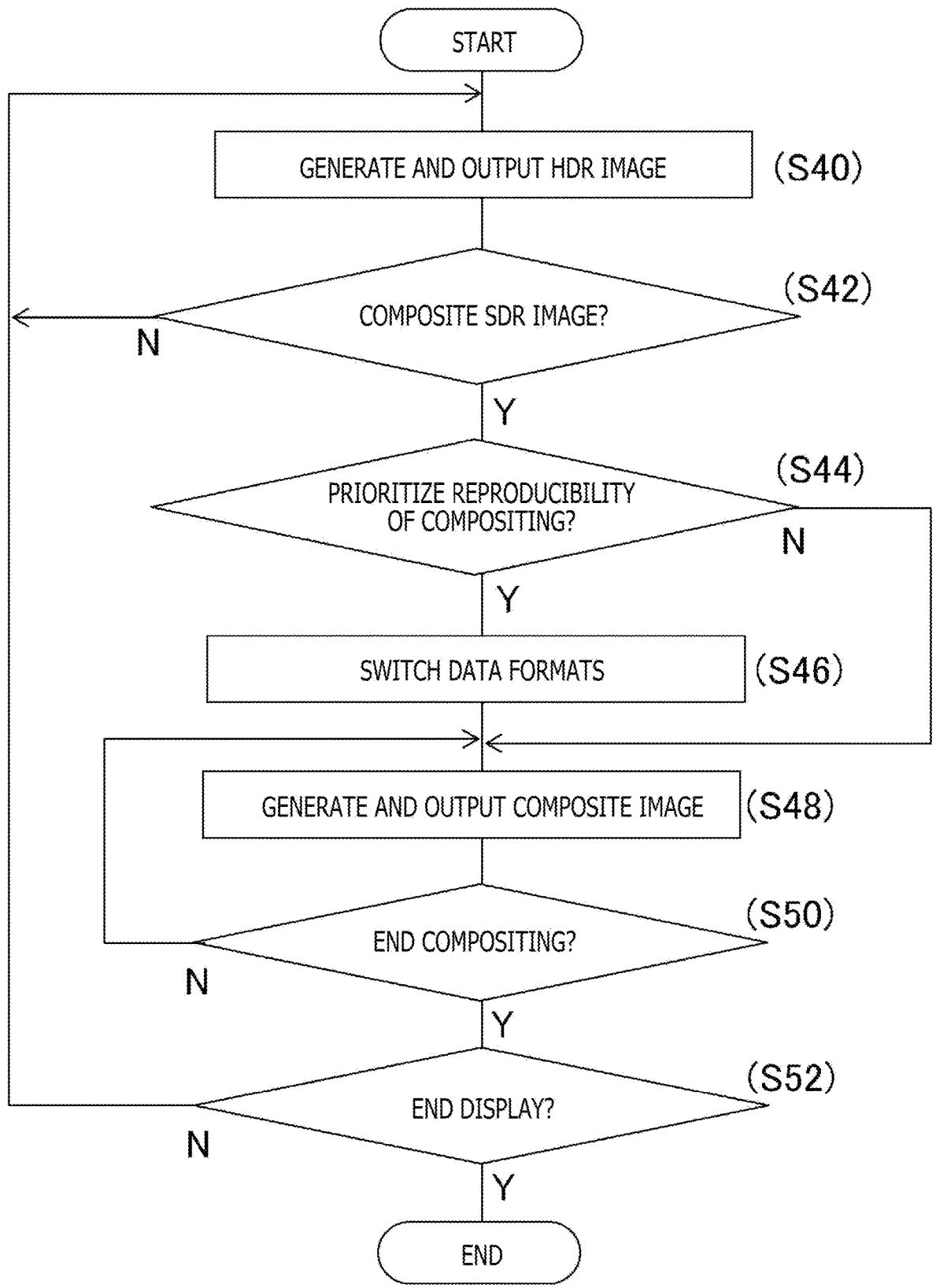
FIG. 11 is a flowchart illustrating a processing procedure for the image generation apparatus according to the present embodiment generating a display image and outputting the display image to a display.

Next, the operation of the image generation apparatus 10 implemented by the configuration described above will be described. FIG. 11 is a flowchart illustrating a processing procedure for the image generation apparatus 10 generating a display image and outputting the display image to the display. This processing procedure is based on the assumption that a main image of an electronic game or the like is generated in HDR and displayed on the HDR display. However, as described above, there is no intention to limit the present embodiment to this combination.

First, when the input information obtaining section 50 obtains the contents of a user operation, the image data generating section 52 generates an HDR image according to the contents of the operation and the output section 58 reads data thereof from the frame buffer 56 and outputs the data to the display (S40). It is noted that the process of generating the display image is not limited to performing rendering on the moment when the user operation is performed and moving image data recorded by this time may be decoded, for example. Further, since only the HDR image is displayed, the frame buffer 56 uses the data format corresponding to the PQ space.

If there is no need to composite the SDR image on the HDR image, the process of generating and outputting the HDR image continues (N in S42). If the SDR image needs to be composited on the HDR image (Y in S42), the data conversion section 62 determines which of the reproducibility of the composite image and the reproducibility of the HDR image is prioritized (S44). For example, in a case where a menu image provided by the system is called up for the purpose of changing settings or the like while an electronic game is being played, the reproducibility of the composite image is prioritized in order to produce a similar compositing state regardless of whether the main image is an SDR or HDR image.

On the other hand, in a case where, for example, a scene of an electronic game being played is saved as a still image or a moving image to be viewed or distributed later, the reproducibility of the HDR image is prioritized in order to ensure that the main image is constantly of high quality. This is also the case where moving image content is reproduced. In this manner, since the priority changes depending on the situation even with the same content, the data conversion section 62 detects the situation according to the user operation and the like obtained by the input information obtaining section 50 and determines the priority. In practice, this processing may be implemented by a logic circuit that determines which priority is higher.

In a case where the reproducibility of the composite image is prioritized (Y in S44), the format control section 54 switches the data format of the frame buffer 56 to the one corresponding to the sRGB space, so that color values of 1.0 or greater can be stored (S46). The image data generating section 52 then stores the result of alpha compositing of the HDR and SDR images converted into the sRGB space in the frame buffer 56 whose format has been switched, and the output section 58 reads and outputs the result (S48). At this time, the output section 58 converts the composite image represented in the sRGB space into video signals in the PQ space and outputs the video signals.

In a case where the reproducibility of the composite image is not prioritized, that is, in a case where the reproducibility of the HDR image is prioritized (N in S44), the data format set in the frame buffer 56 with only the HDR image being displayed is left unchanged. This data format corresponds to the PQ space. Then, the image data generating section 52 converts the data of the SDR image into the data in the HDR luminance range and stores the result of alpha compositing with the HDR image in the PQ space in the frame buffer 56, and the output section 58 reads and outputs the result (S48).

During the period in which SDR compositing continues (N in S50), the process of storing a composite image in the frame buffer 56 in the same data format and outputting the composite image is repeated at a predetermined frame rate (S48). When compositing needs to end (Y in S50), the processing returns to the generation and output of an HDR image in S40 while the display itself continues (N in S52). After that, the processes from S40 to S50 are repeated, and when the display needs to end, all the processes end (Y in S52).

Next, the determination criteria for switching between compositing of the SDR image and the HDR image in the PQ space and compositing of the SDR image and the HDR image in the sRGB space are exemplified. As described above, compositing in the PQ space maintains the quality of the HDR image, while compositing in the sRGB space achieves the reproducibility of the composite image. Therefore, in the following description, the former will be referred to as an "image-quality prioritizing mode," and the latter will be referred to as a "compositing prioritizing mode." To switch these modes, the following criteria are set, for example.

1. The image-quality prioritizing mode is set in a case where the system is executing an application in which it is not desirable to impair the HDR color reproducibility among applications provided by the system, and the compositing prioritizing mode is set in other cases.

2. The image-quality prioritizing mode is set in a case where there are no or a few elements represented translucently in the display image, and the compositing prioritizing mode is set in a case where there are many elements represented translucently.

3. The image prioritizing mode and the compositing prioritizing mode are switched according to the specification in the content that is not under the system control.

Figure 12:
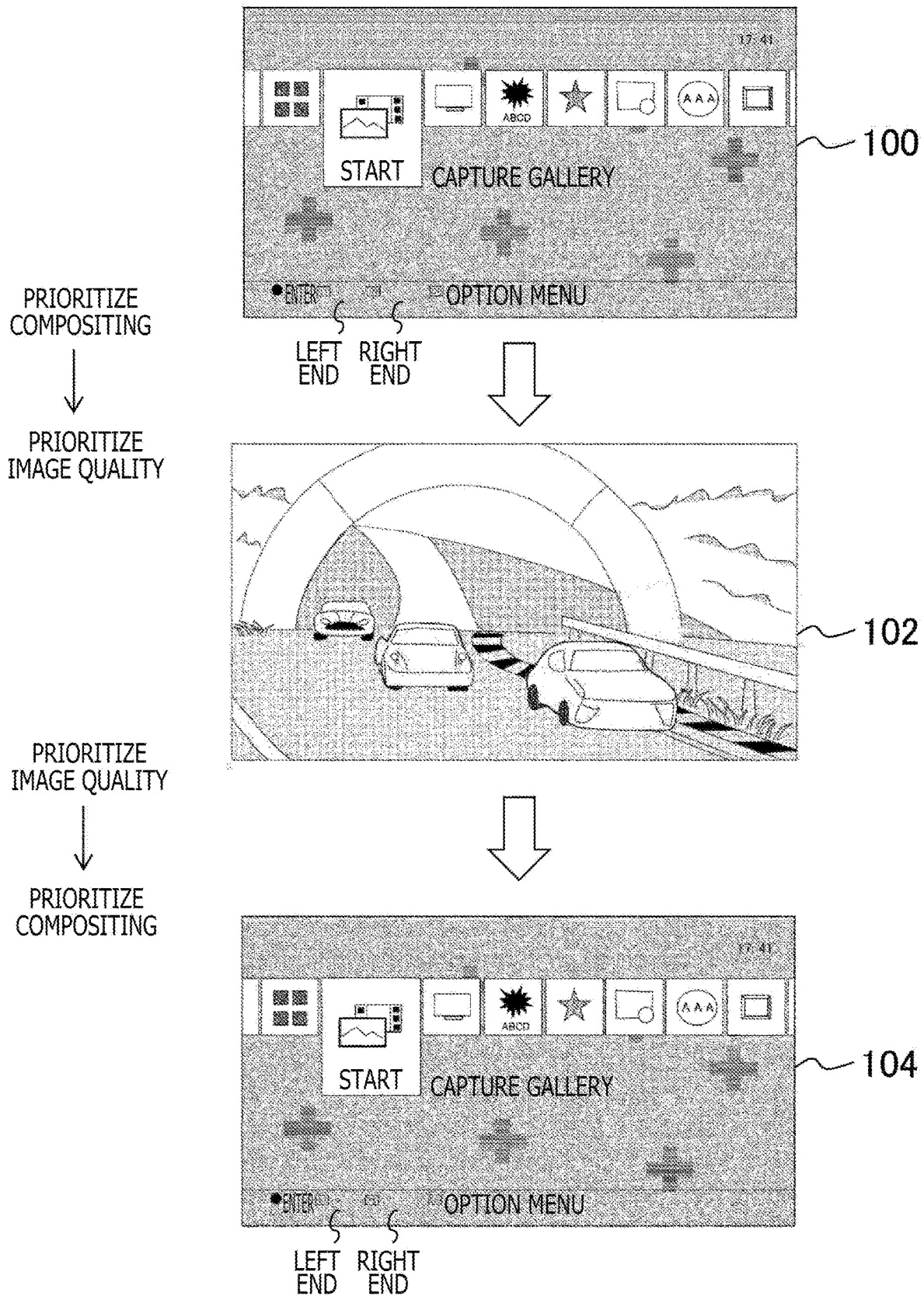
FIG. 12 is a diagram exemplifying the transition of images displayed in a case where the present embodiment is applied.

FIG. 12 exemplifies an example of the transition of images displayed in a case where the present embodiment is applied. This example is a situation in which the above-described 1 is applied. An image 100 is a home screen on which an application provided by the system is selected. During the period in which an image of such a configuration is displayed, the compositing prioritizing mode is set. In the image 100, assume that an application called "capture gallery" is selected.

The "capture gallery" is an application in which a captured image taken during previous game play and representing how the play was going is viewed at a later timing. For example, an image during the game, such as an image 102, is displayed. During the period in which such an image is displayed, it is desirable to accurately reproduce how the game was going. Therefore, as illustrated on the left side of the figure, when the screen configuration is switched, the compositing prioritizing mode is switched to the image-quality prioritizing mode. Then, when the user finishes viewing and performs an operation of closing the image 102, an image 104 representing the home screen is displayed again. At this time, along with the switch to the home screen, the image-quality prioritizing mode is switched back to the compositing prioritizing mode.

Figure 13:
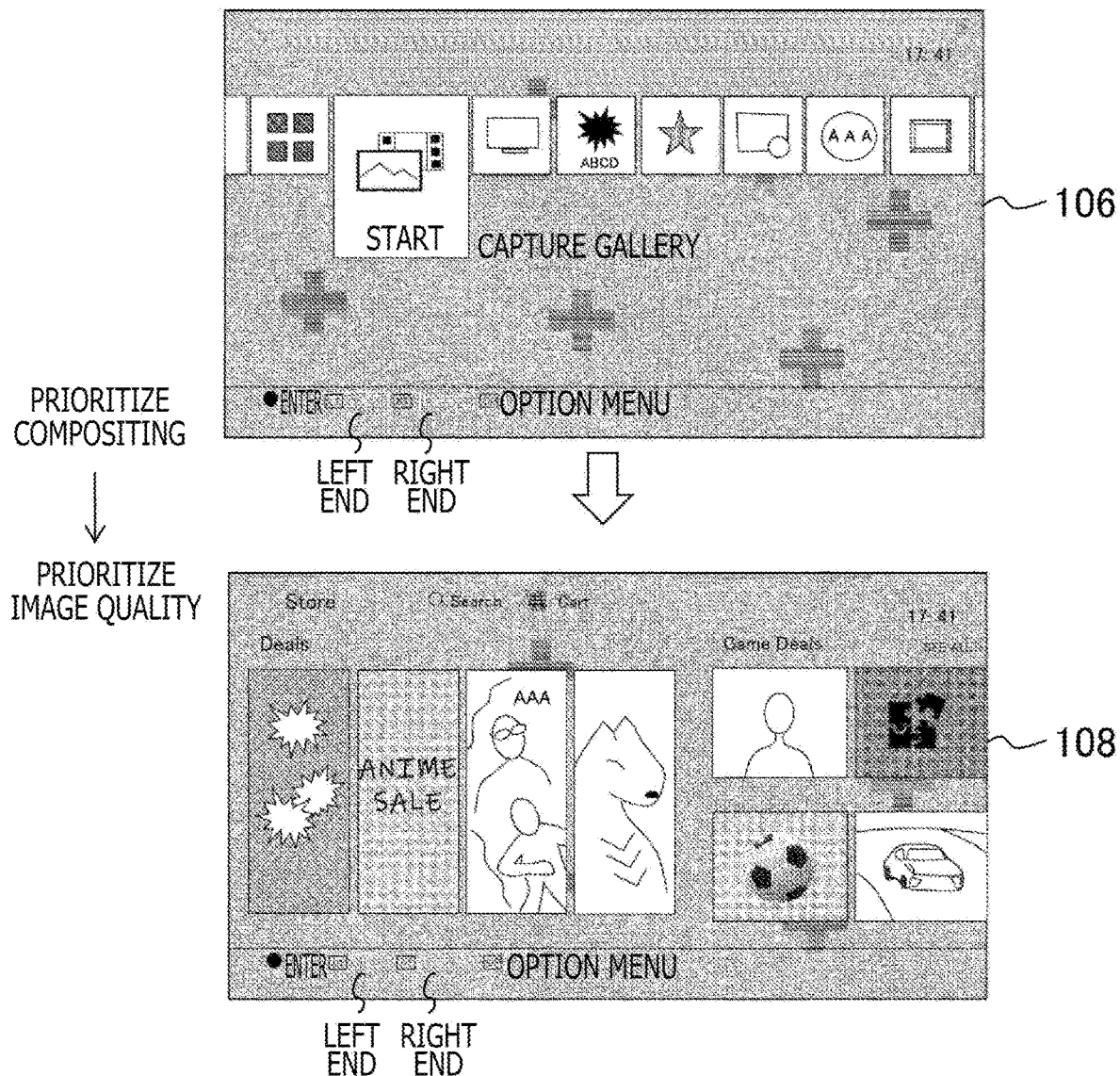
FIG. 13 is a diagram illustrating another example of the transition of images displayed in a case where the present embodiment is applied.

FIG. 13 illustrates another example of the transition of images displayed in a case where the present embodiment is applied. This example represents a situation in which the above-described 2 is applied. An image 106 represents a case where many of component images (elements) that constitute the image are represented translucently. In this case, if the compositing result changes, the impression of the appearance changes significantly. Therefore, the compositing prioritizing mode is set to achieve a stable display.

By contrast, an image 108 represents a case where there are a few elements represented translucently. In this case, even if the compositing result changes, the impression does not change very much. Therefore, high-quality image display is maintained as the image-quality prioritizing mode. The switch between the two modes is determined according to a set threshold such as the number of elements represented translucently, the areas of images represented translucently, or the like, for example.

FIG. 14 illustrates another example of the transition of images displayed in a case where the present embodiment is applied. Although this example represents a situation in which the above-described 3 is applied, this example is not limited to the transition between image-quality prioritizing mode and the compositing prioritizing mode. Here, an image 110 is a menu screen provided by the system, while an image 112 is a game screen generated by the game content being executed. Images 114 and 116 are results of compositing of the images 110 and 112.

Of these images, the image 114 represents a composite image for a case where the content specifies compositing in the linear space. Accordingly, the data conversion section 62 composites the image 110 and the image 112 by converting the data of the image 110 and the image 112 into the linear space by EOTF or the like. By contrast, the format control section 54 sets the frame buffer 56 to a data format that can store linearly quantized values. For example, the data format set here is a floating-point format in which 16 bits are set for each of the primary colors and 16 bits are set for the α value. It is noted that the data format is not limited thereto.

An image 115 is a composite image for a case where the content specifies compositing in a gamma 2.2 space. Accordingly, the data conversion section 62 sets the final conversion destination in (b) of FIG. 10 to the gamma 2.2 space. By contrast, the format control section 54 sets a fixed-point format in which 8 bits are set for each of primary colors and 8 bits are set for the α value, for example. It is noted that the data format is not limited thereto. Allowing the compositing space to be specified in the content in this manner can always reflect the intention of the content creator. Therefore, the system may provide an application programming interface (API) for the content creator to specify the space.

According to the present embodiment described above, an apparatus that generates a display image can switch the data format of the frame buffer according to the situation. Accordingly, even if values that exceed the numerical range generally obtained are generated as a result of switching of the conversion function used for quantization of pixel values, the values can be written to the frame buffer as they are. This configuration can alleviate restrictions on the combination of the luminance range and the conversion function, such as an SDR image and the gamma curve such as sRGB or an HDR image and the PQ curve.

As a result, if the HDR image is converted using the gamma curve and composited with the SDR image, the resulting representation can be similar to the one in a case where SDR images are composited. Further, in a situation in which it is desired to prioritize the dynamic representation of the original HDR image over the reproducibility of such a composite image, compositing can be performed in the PQ space without switching the data format. In this manner, even if the luminance range of the original image or the display changes in various ways, the mode of the display image can be controlled suitably.

The present invention has been described above on the basis of the embodiment. The above-described embodiment is an exemplification, and it is to be understood by those skilled in the art that various modifications can be made to combinations of each constituent component and each processing process in the embodiment and that such modifications also fall within the scope of the present invention.

INDUSTRIAL APPLICABILITY

As described above, the present invention can be used for various apparatuses such as display apparatuses, content reproduction apparatuses, and game apparatuses, and systems including the apparatuses.

REFERENCE SIGNS LIST

8: Network
10: Image generation apparatus
14: Input apparatus
16: Display
22: CPU
24: GPU
26: Main memory
36: Output section
38: Input section
50: Input information obtaining section
52: Image data generating section
54: Format control section
56: Frame buffer
58: Output section
60: Image rendering section
62: Data conversion section
70: Frame buffer

The invention claimed is:

1. An image generation apparatus comprising:
an image data generating section configured to generate data of a display image;
a frame buffer configured to store data of an image generated;
a format control section configured to, in a case where the image data generating section executes alpha compositing of a plurality of images, switch a data format of pixel values to be stored in the frame buffer; and
an output section configured to read the data of the image from the frame buffer, convert the data into a format corresponding to a display, and output resulting data,
wherein the format control section switches the data format by changing:
whether a decimal point of the data to be stored is fixed or floats, and
the number of bits to be assigned to each color.

2. The image generation apparatus according to claim 1, wherein the image data generating section performs the alpha compositing after obtaining quantized data of an image that is subject to compositing and that has a predetermined characteristic with respect to luminance, by using a conversion function determined independently of a transfer function used by a display apparatus connected.

3. The image generation apparatus according to claim 2, wherein the image data generating section selects one of a plurality of conversion functions to obtain the quantized data of the image that is subject to compositing, and
the format control section switches the data format to a data format corresponding to the selected conversion function.

4. The image generation apparatus according to claim 2, wherein, when a composite image is displayed on the display that performs HDR display, the image data generating section applies one of an sRGB curve, a gamma 2.2 curve, a gamma 2.4 curve, and a linear characteristic as the characteristic with respect to the luminance.

5. The image generation apparatus according to claim 1, wherein, when the alpha compositing begins execution, the format control section determines whether or not to switch the data format according to priority between reproducibility of a pre-compositing image and reproducibility of a composite image.

6. The image generation apparatus according to claim 1, wherein, when a configuration of an image that is subject to compositing is switched, the format control section switches the data format to a data format associated with the switched configuration.

7. The image generation apparatus according to claim 1, wherein the format control section switches the data format on a basis of a number or areas of elements to be composited translucently on the display image.

8. The image generation apparatus according to claim 1, wherein
according to specification of an application executing content, the image data generating section converts a characteristic of data of an image that is subject to compositing with respect to luminance, and
the format control section switches the data format to a data format corresponding to the characteristic.

9. The image generation apparatus according to claim 1, wherein the image data generating section performs the alpha compositing by linearly converting a characteristic of each of a plurality of images to be composited with respect to luminance, commonizing a luminance range to be defined, and giving a common characteristic to the luminance.

10. An image generation method performed by an image generation apparatus that generates data of a display image, stores the data in a frame buffer, and outputs the data, the image generation apparatus comprising:
in a case where alpha compositing of a plurality of images begins execution, switching a data format of pixel values to be stored in the frame buffer by changing
whether a decimal point of the data to be stored is fixed or floats, and
the number of bits to be assigned to each color;
generating data of the plurality of images, alpha compositing the data, and storing resulting data in the frame buffer; and
reading the data of an image from the frame buffer, converting the data into a format corresponding to a display, and outputting resulting data.

11. A non-transitory computer readable medium having stored thereon a computer program for a computer that generates data of a display image, stores the data in a frame buffer, and outputs the data, comprising:

by a format control section, in a case where alpha compositing of a plurality of images begins execution, switching a data format of pixel values to be stored in the frame buffer;

by an image data generating section, generating data of the plurality of images, alpha compositing the data, and storing resulting data in the frame buffer; and by an output section, reading the data of an image from the frame buffer, converting the data into a format corresponding to a display, and outputting resulting data, wherein the format control section switches the data format by changing:

whether a decimal point of the data to be stored is fixed or floats, and the number of bits to be assigned to each color.

* * * * *